United States Patent [19]

Cottrell

[11] 4,309,622

[45] Jan. 5, 1982

[54] PORTABLE ELECTRIC AUTOMOTIVE ENGINE CRANKING UNIT

[76] Inventor: Gerald G. Cottrell, 411 Clyde Ave., Wisconsin Rapids, Wis. 54494

[21] Appl. No.: 83,595

[22] Filed: Oct. 11, 1979

Related U.S. Application Data

[63] Continuation-in-part of Ser. No. 954,858, Oct. 26, 1978.

[51] Int. Cl.³ .................................................. H02J 7/04
[52] U.S. Cl. .............................. 307/150; 307/10 BP; 307/127; 307/130; 320/59; 320/DIG. 2
[58] Field of Search ................. 307/150, 70 BP, 10 R, 307/127, 130, 117; 320/57, 59, DIG. 2; 363/54, 85, 128

[56] References Cited

U.S. PATENT DOCUMENTS

| | | | |
|---|---|---|---|
| 2,659,042 | 11/1953 | Anderson et al. | 320/48 X |
| 3,300,702 | 1/1967 | Noddin | 320/25 |
| 3,349,310 | 10/1967 | Ladoniczki | 320/25 |
| 3,406,318 | 10/1968 | Harland, Jr. et al. | |
| 3,470,440 | 9/1969 | Rheingold et al. | 320/25 |
| 3,675,032 | 7/1972 | Shaheen | 290/386 |
| 3,729,637 | 4/1973 | Gray | 307/10 BP |
| 3,748,568 | 7/1973 | Ackermann | 320/DIG. 2 X |
| 3,781,631 | 12/1973 | Nelson et a. | 320/25 |
| 3,800,209 | 3/1974 | Milnear | 320/25 |
| 3,942,027 | 3/1976 | Fima | 307/10 R |
| 3,969,665 | 7/1976 | Rowas | 320/DIG. 2 X |
| 4,075,504 | 2/1978 | Gnaedinger | 307/66 |
| 4,079,304 | 3/1978 | Brandenberg | 320/25 |

*Primary Examiner*—L. T. Hix
*Assistant Examiner*—James L. Dwyer
*Attorney, Agent, or Firm*—Kinney, Lange, Braddock, Westman and Fairbairn

[57] ABSTRACT

A portable power pack for starting and operating automotive engines includes a transformer having a primary winding provided with wires to be plugged into a standard 110 volt 60 hertz electrical supply and a center-tapped secondary winding connected to a pair of silicon controlled half wave rectifiers to provide a direct current output at approximately 16 volts. A remotely operable trigger or gate circuit is provided to cause the silicon controlled rectifiers to fire only at the time it is desired that electrical power be fed to the automotive engine which is to be started or operated. With the exception of the electrical leads from the standard source of alternating current, to the automotive engine, and to the point of remote operation of the trigger circuit, the entire power pack is potted in a solid, thermally stable, thermally conductive material to rapidly dissipate the heat generated within the potted electrical elements of the power pack when it is delivering electrical power to an automotive engine.

18 Claims, 10 Drawing Figures

PORTABLE ELECTRIC AUTOMOTIVE ENGINE CRANKING UNIT

REFERENCE TO CO-PENDING APPLICATION

This application is a continuation-in-part of my patent application Ser. No. 954,858 filed Oct. 26, 1978.

BACKGROUND OF THE INVENTION

This invention relates to an electrical power pack which is useful to furnish power to an electrical starter motor of a fossil or synthetic fuel engine and/or to furnish the electrical power needed to maintain the operation of such an engine. This specification reads in terms of spark fired internal combustion engines, but it is to be understood that the power pack of the invention will be effective to supply electrical power to other vehicle mounted or stationary engines such, for example, as diesel, wankel or turbine engines, or DC electric motors, which use or require a direct current power source at or near a specified voltage for starting or for maintaining the operation thereof.

There are three principal recognized procedures for starting automotive vehicles in extreme cold weather situations and in other situations where the vehicle's regular battery has become rundown or otherwise defective to the point of not being able to furnish sufficient direct current power to start and/or maintain operation of its engine.

First, the vehicle engine battery can be recharged by connecting it to a battery charger or other outside source of direct current over an extended period of time, and when the battery is sufficiently recharged, utilizing it to start the engine of the automotive vehicle. The amount of direct current which can safely be fed to a dead or partially discharged battery, and the amount of the charge in the battery plus the ability of the battery to accept a rapid charge determines the time period over which the battery charger must be kept in place. This is usually a considerable length of time ranging from approximately one hour when very high and potentially dangerous amounts of current are fed to the battery to overnight or even longer where a safer and smaller charge is applied.

A patent which includes, among other things, a circuit to apply a charge to a vehicle's battery is U.S. Pat. No. 3,675,032 to Shaheen, granted July 4, 1972. See rectifying circuit 40 connected to battery 30 and specification, column 2, lines 1 through 9.

Second, so-called "jumper cables" can be used to hook a viable battery of a running automotive vehicle to the dead battery of the stalled vehicle. Usually the battery and generator of the operative vehicle are allowed to deliver a charge to the battery of the stalled vehicle for a sufficient length of time to start recharging the battery of the stalled vehicle at least to a point where the chemicals and plates in the battery in the stalled vehicle are somewhat heated to increase their chemical activity and their ability to receive and deliver power. Then the starter of the stalled vehicle is activated with the generator and battery of the operative vehicle still feeding power to the stalled engine system.

In conditions of extreme cold, this procedure will sometimes immediately provide enough power to the stalled vehicle's starter motor to at least allow the starter motor to turn over the stalled engine. After several attempts with a wait between times to allow the battery of the stalled vehicle to be recharged and further heated, the power delivered to the stalled vehicle is often sufficient to turn over the engine and still supply sufficient power to the ignition system to fire the plugs in the cylinders so that the stalled engine will start.

Use of this procedure requires that an operative automotive vehicle be brought into position adjacent the stalled vehicle so that the batteries are close enough to allow the jumper cables to be connected. In the typical ice and snow conditions of midwinter, this is always inconvenient and is often impossible.

A patent which utilizes the battery jumper system for starting stalled vehicles is U.S. Pat. No. 4,079,304 to Brandenburg, granted Mar. 14, 1978.

Third, in parts of the country where the temperature can range to 40° below zero C and F, many service stations provide gasoline engine driven, direct current generators which are permanently or temporarily mounted in pickup truck beds or on tow trucks. These trucks can bring the motor-generators to positions near the stalled automotive vehicles, and extra long cables can be used to connect the portable motor-generators to the positive battery terminals and to ground on the stalled automotive vehicles. Each portable direct current generator is then run at a high speed to provide a substantial over-voltage to the battery and engine of the stalled vehicle, and the starter on the stalled vehicle is activated. This procedure is usually effective to start the engine of a stalled vehicle in a minimum amount of time, if time is figured from when the truck mounted motor-generator arrives at the site of the stalled vehicle.

A patent which shows a silicon controlled rectifier used in a circuit for supplying direct current to charge a battery is U.S. Pat. No. 4,075,504 to Gnaediner, granted Feb. 21, 1978. In this patent, the silicon controlled rectifier supplies a charging current to a battery by delivering direct current coming from the secondary of a transformer through two half wave rectifiers comprising a pair of diodes. The direct current from those diodes is also used to simultaneously power "D.C. loads such as lights, pumps, and the like in a recreational vehicle". When the current drain on the double half wave or full wave rectifier is more than can safely be delivered by it and the transformer, the heat generated by the diodes and by the silicon controlled rectifier is utilized to operate a thermally responsive switch which shuts down the input gate of the silicon controlled rectifier, interrupting its action to charge the battery until the heat has been dissipated.

It is evident that such circuitry will not be useful in providing a remotely controlled, silicon rectifier supplied, direct current from the secondary of a transformer to accomplish the purposes of the power pack of the present invention.

A circuit in which a half wave recitifer utilizing a diode is used in a conventional manner to charge a battery and then is later used with the opposite half wave rectifier to supply an "over-voltage" to an ignition system is shown in U.S. Pat. No. 3,729,637 to Gray, granted on Apr. 24, 1973.

Other patents which were located in a preliminary search of the art related to the present invention are not believed to be particularly pertinent to the invention and are set out below as follows:

U.S. Pat. No. 3,894,242 to Helling, granted July 8, 1975;

U.S. Pat. No. 3,967,133 to Bokern, granted June 29, 1976; and

U.S. Pat. No. 3,471,706 to Schneider, granted Oct. 7, 1969.

Neither applicant nor his agents and those in privity with him know of any art closer than that listed and discussed above.

To provide a light, easily hand-carried portable power pack which can instantaneously deliver large amounts of direct current upon demand of a remote engine operator, and which is not subject to the drawbacks of the prior art, the present invention was developed.

SUMMARY OF THE INVENTION

Two semiconductor devices such as two silicon controlled rectifiers are associated with the secondary of a transformer to provide full wave rectified direct current to the electrical input terminals of a fluid fueled engine from a standard alternating current source connected across the primary of the transformer. A remotely operable gate circuit is provided for the semiconductor devices so that they can be rendered operative to supply such direct current power to such engine electrical input terminals under control by an operator at a remote location as, for example, by an operator located in position to operate the ignition, throttle, and/or other controls of the engine.

The transformer, semiconductor devices, and control circuitry can be assembled in a complete unit to form a portable electrical power pack, with the exception of electrical lead lines connectable to the source of alternating current power, the electrical cables to connect the direct current power to the engine electrical input terminals, and the control leads and remotely operable switch which form a part of the gate circuitry for the semiconductor devices. The elements so assembled in a unitary portable power pack case can be potted in a solid, thermally stable, thermally conductive material which will tend to relatively rapidly dissipate the heat generated in the transformer and other potted electrical elements.

The power pack of the invention can be connected effectively across the terminals of a battery normally utilized to maintain the fossil fuel engine in operation after it is started. When effectively connected across such a storage battery, the power pack will tend to charge the battery as well as to supply the necessary electrical power to start and/or maintain operation of the engine.

The present invention also preferably includes means for sensing the direct current voltage being supplied to the electrical cables. The voltage sensing means is connected to the gate circuit to disable the gate circuit, and thereby render the apparatus inoperative if the voltage between the cables is less than a predetermined threshold value or is of the wrong polarity. The voltage sensing means, therefore, prevents the apparatus from operating in the event that the cables are connected to the wrong battery terminals, or if a short circuit exists between the two cables.

DETAILED DESCRIPTION OF PREFERRED EMBODIMENTS

Figure 2:
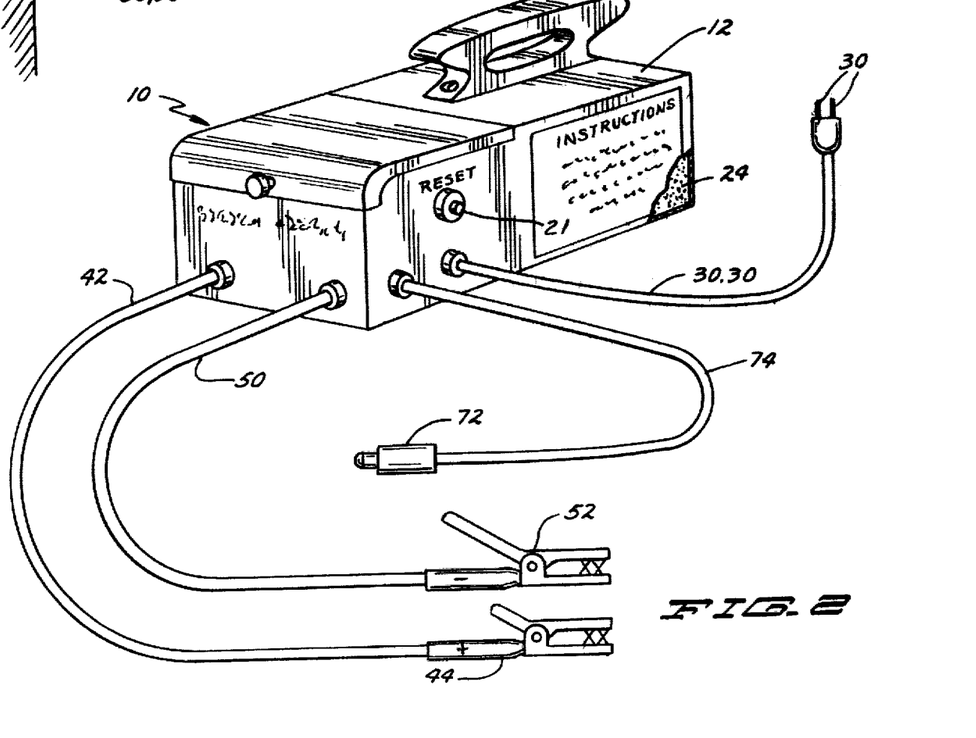
FIG. 2 is a perspective view of the power pack of the invention and the external electrical lines therefor.
Figure 3:
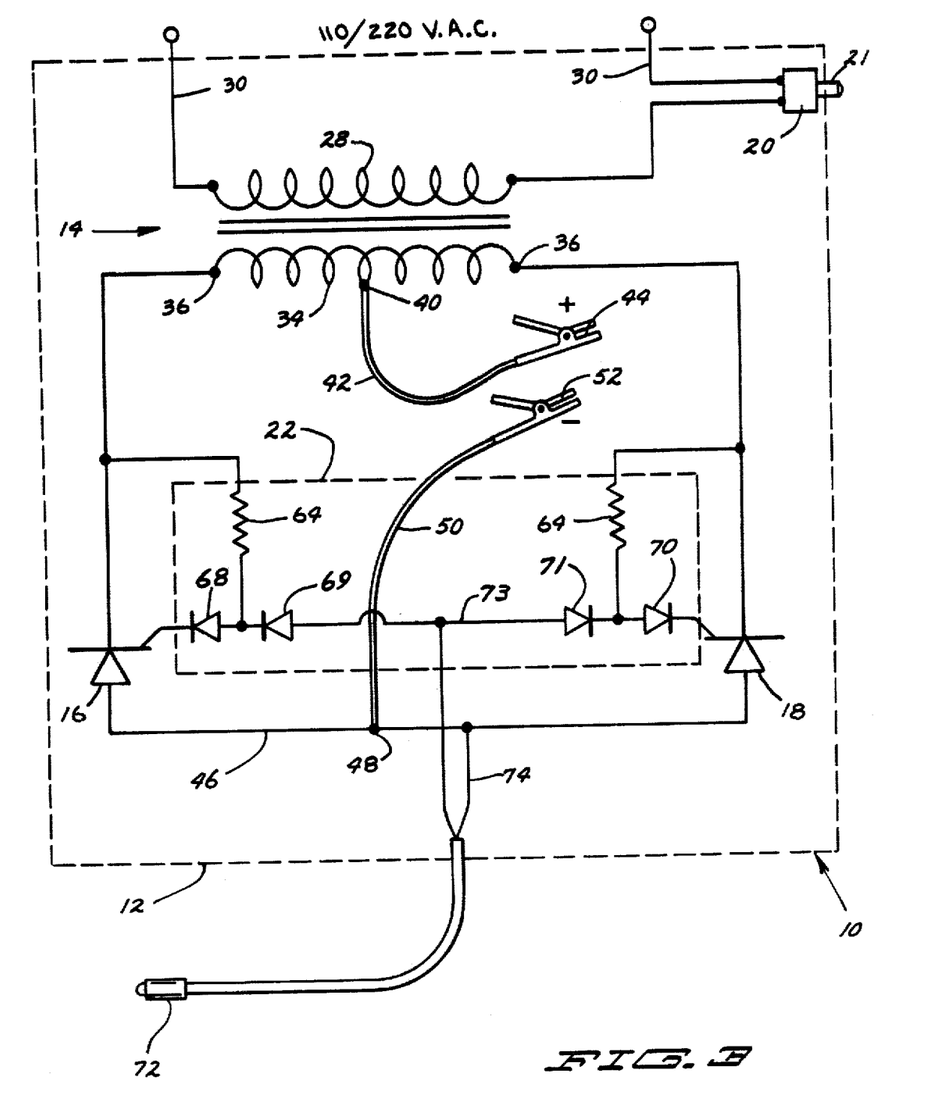
FIG. 3 is a schematic and diagrammatic representation of the electrical circuitry of the power pack of the invention.

A portable electrical power pack or power supply 10 includes an outer case 12; a transformer 14; a pair of semiconductor devices illustrated herein as being silicon controlled rectifiers 16 and 18; a circuit breaker 20; and a gate control circuit for these silicon controlled rectifiers indicated generally at 22.

All of these electrical elements can be potted in an appropriate solid, thermally stable, thermally conductive material, such, for example, as an epoxy resin. The resulting block of potting compound will be in heat conductive relationship to the electrical elements and to the outer case, and is indicated as at 24.

A handle 26 is provided for the power pack 10 and is offset over the transformer portion of the power pack so that the power pack will be in balance when carried by the handle.

In a typical installation, a primary winding 28 of transformer 14 can have 110 volts at 60 Hertz impressed upon it by plugging input lead wires 30,30 into a conventional electrical outlet box 32 which is connected to a source of such alternating electrical current (not shown).

A secondary winding 34 of transformer 14 is center-tapped with outside terminals 36,36 of the secondary winding going to the cathodes of silicon controlled rectifiers 16 and 18 respectively. A center terminal 40 of secondary winding 34 is connected to an output cable 42 which extends outside of case 12. The cable 42 is connected to a positive alligator clamp 44.

The anode terminals of silicon controlled rectifiers 16 and 18 are connected to each other by electrical line 46, and an output terminal 48 thereon is connected to an output cable line 50 which also extends outside of the case 12 and has connected thereto a negative alligator clamp 52.

Figure 1:
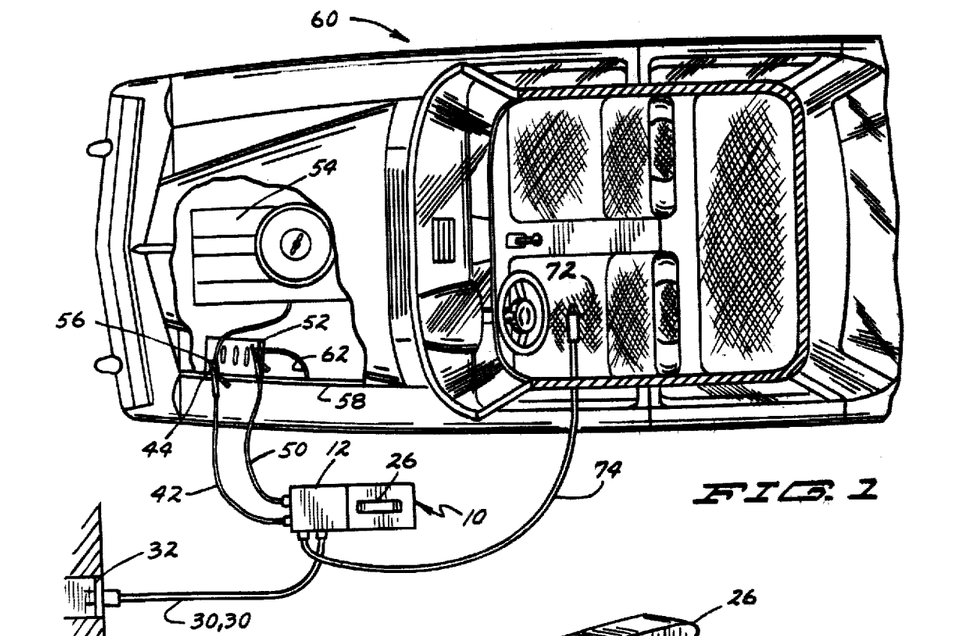
FIG. 1 is a top plan view of the power pack of the invention showing its relationship to a source of alternating current, to the input terminals and battery of an automotive engine and to the driver's compartment or control station for that engine.

As seen in FIG. 1, the alligator clamps 52 and 44 can be connected to the electrical power input terminals of an automotive engine 54. These terminals as illustrated herein are the positive and negative terminals of automotive engine battery 56, the negative terminal of which is grounded to a frame 58 of an automobile 60 as at 62.

As shown, circuit breaker 20 is situated in one of the input leads 30, and a reset button 21, forming part of the circuit breaker extends through the side wall of the outside case 12 of the power pack. Alternatively, circuit breaker 20 may be an automatic resetting circuit breaker.

Also as shown, the gate control circuit 22 for the rectifiers 16 and 18 includes a pair of resistors 64,64 each connected to the cathode of one of the silicon controlled rectifiers on one end and between two diodes of two pairs of diodes 68, 69 or 70,71 on the other end, respectively. The cathodes of diodes 68 and 70 are each connected to the gate of one of the silicon controlled rectifiers, and the anodes of diodes 69 and 71 are connected to each other by an electrical line 73. A normally open push button switch 72 in a control line 74 normally provides an open circuit between line 73 and line 46 to prevent the firing of either of the silicon controlled rectifiers 16 and 18.

With the various electrical lead lines positioned as seen in FIG. 1, the ignition switch (not shown) of automotive engine 54 will be turned on, the electrical starter motor (not specifically shown) of the engine 54 will be switched on, and simultaneously the push button switch 72 will be pushed to close that switch, causing silicon controlled rectifiers 16 and 18 to fire supplying direct current to the engine electrical input terminals. In the illustration given above about 16 volts can be available. This power will cause the starter motor of engine 54 to be activated and will also supply the necessary iginition voltage. Thus, the engine will "turn over" and the spark plugs will be fired. This action will take place whether battery 56 is partially charged, completely dead, or even not present.

After the engine starts under the action of the direct current supplied to it by the portable electrical power pack of the invention, if there is a battery 56 and if it can hold any charge, the push button switch 72 can be released, and the engine will continue in operation.

If there is no battery present, the push button switch 72 can be maintained in its activated, closed condition, and the power to operate the ignition can continue to come from the power pack of the invention.

In certain instances, an engine driven generator can take over the powering of the ignition system, and then the power pack can be deactivated by releasing the switch 72. The power pack need not be utilized again until such time as it is necessary to start the engine again.

Figure 4:
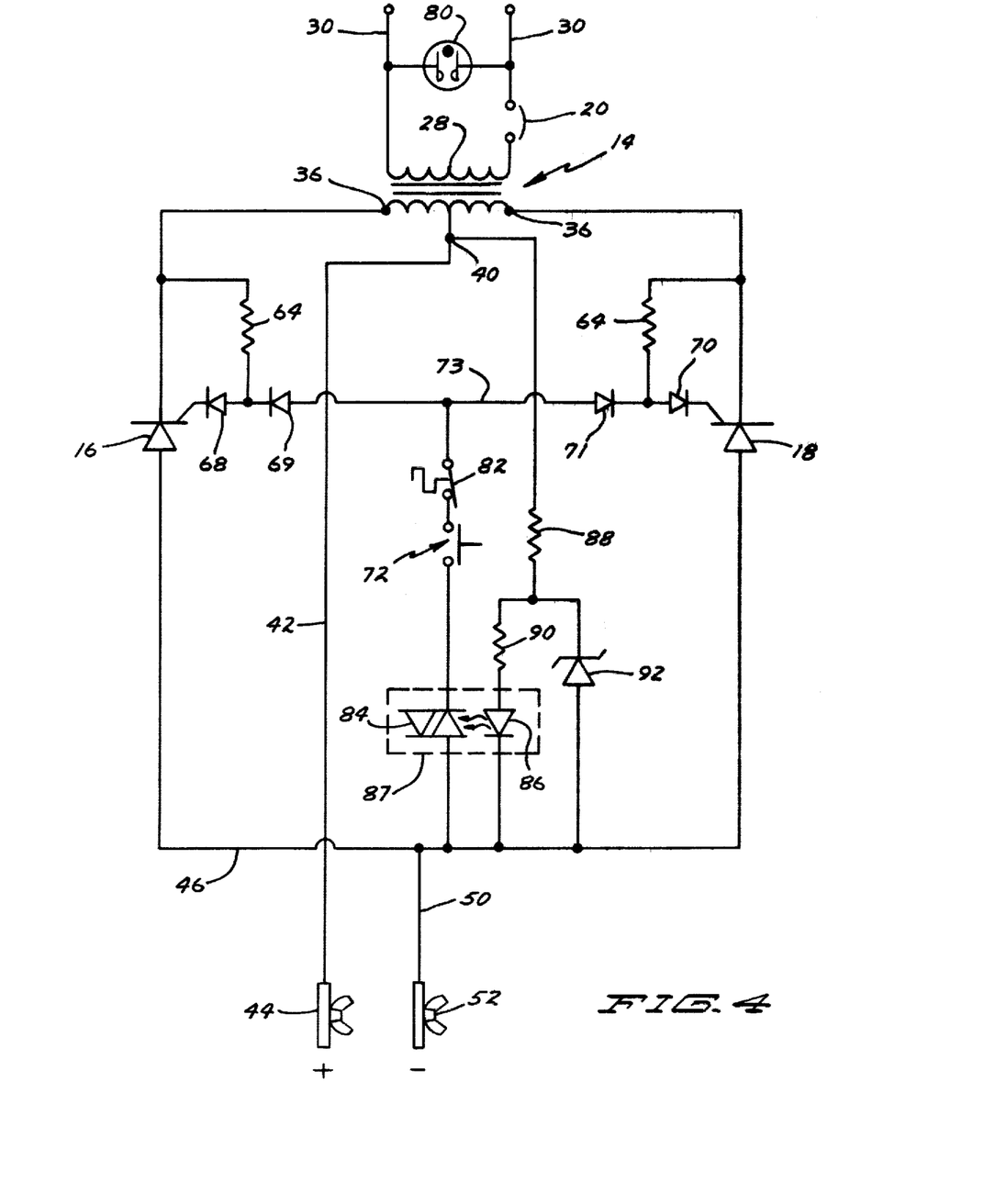
FIGS. 4, 5 and 6 are schematic representations of preferred embodiments of the electrical circuitry of the power pack of the present invention which include means for sensing the voltage between the cables.
Figure 5:
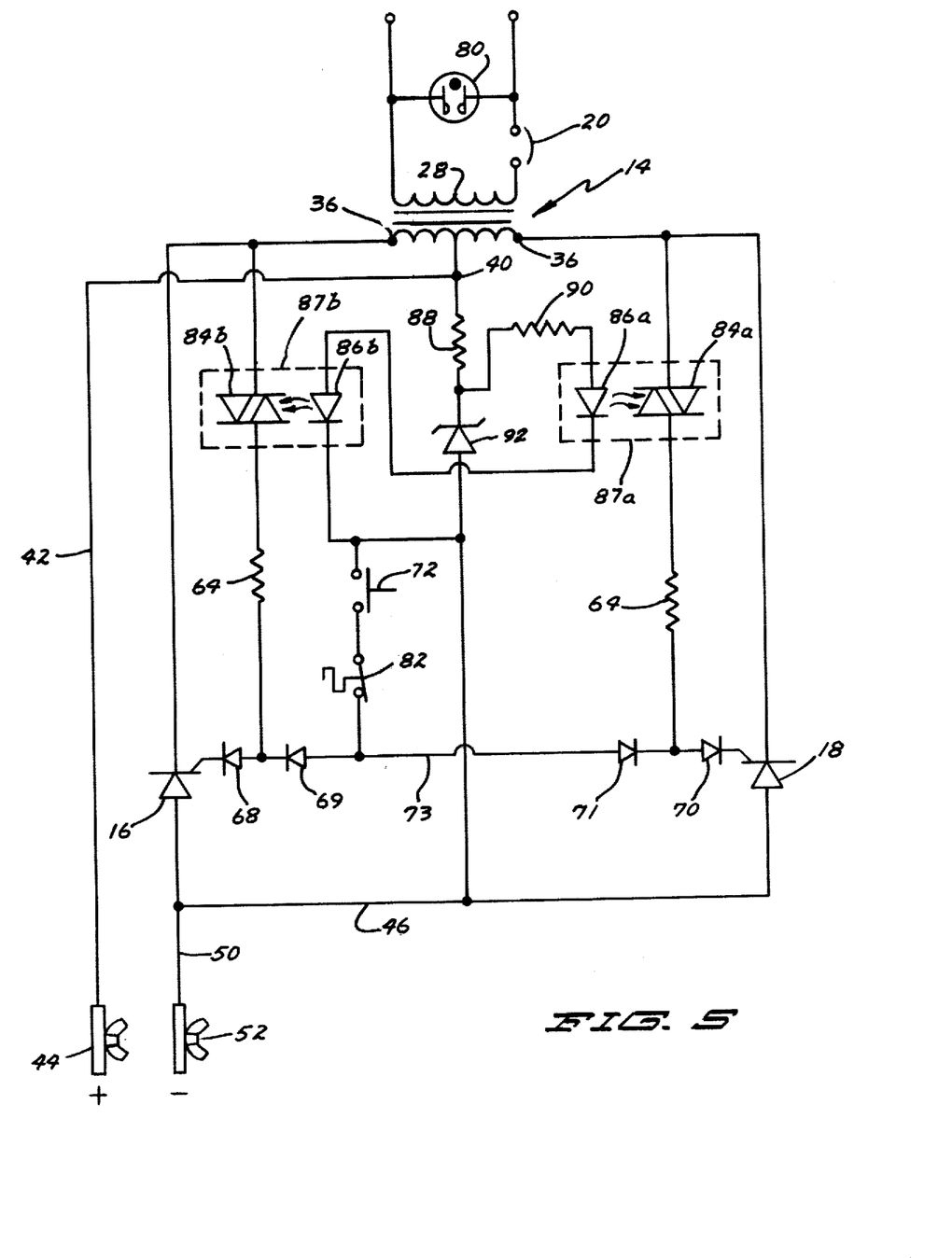
Figures 6, 7:
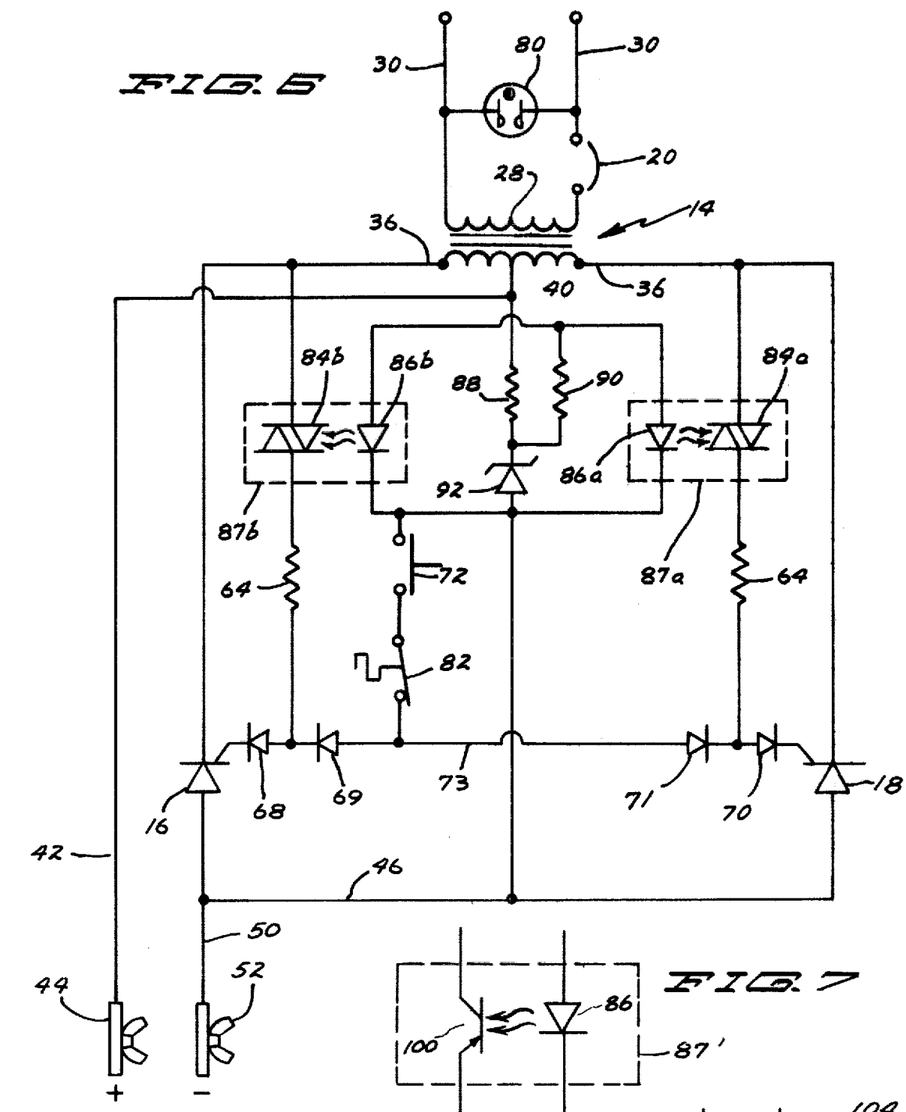
FIGS. 7, 8 and 9 show alternative voltage sensing and switching devices for use in the power pack of FIGS. 4–6.

FIGS. 4, 5 and 6 are electrical schematic diagrams of three additional embodiments of the circuitry within housing 12. In each of the embodiments shown in FIGS. 4, 5 and 6, the circuit is basically similar to the circuit shown in FIG. 3. For that reason, similar numerals have been used to designate similar elements.

Each of the three circuits shown in FIGS. 4–6 prevent operation of the power pack in the event that the operator tries to reverse-connect alligator connectors 44 and 52. In other words, the circuit is prevented from operating if positive connector 44 is incorrectly connected to the negative terminal of a battery and negative terminal 52 is incorrectly connected to the positive terminal of the battery.

In addition, each of the circuits provides short circuit protection. In other words, the circuit will not operate if there is a short circuit between connectors 44 and 52.

Finally, each of the circuits shown in FIGS. 4–6 provide protection against overheating of the power pack.

In the embodiment of the present invention shown in FIG. 4, neon tube 80 has been added to the primary circuit that is connected between lines 30,30. The purpose of neon tube 80 is to provide an indication of when the input AC power is being received. Also, in FIG. 4, circuit breaker 20 is shown as an automatic resetting circuit breaker, but a manually resettable circuit breaker as shown in FIGS. 2 and 3 may alternatively be used.

In the current path between line 46 and line 73, normally closed thermal limit switch 82 and photosensitive triac 84 are connected in series with normally open switch 72. SCR's 16 and 18 can be fired only when line 73 is connected with line 46 through photosensitive triac 84, switch 72, and thermal limit switch 82. Switch 72, of course, is normally open and is closed whenever the operator presses a button to close the contacts of switch 72. Thermal limit switch 82 remains closed at all times until the temperature of the power pack exceeds a selected level. At that point, thermal limit switch 82 opens, thereby preventing further operation of the circuit even if switch 72 remains closed. When the temperature decreases to a safe level, switch 82 will again close and operation of the circuit is again possible. Alternatively, switch 82 may be of the type which is resettable after opening, so that the operator must reset switch 82 to a closed state before operation of the power pack is again possible.

Photosensitive triac 84 provides both short circuit protection and protection against reversing the polarities attached to connectors 44 and 52. Triac 84 is actuated by light from light-emitting diode 86. Triac 84 will only operate when light from light-emitting diode 86 is received. In the preferred embodiments of the present invention photosensitive triac 84 and light-emitting diode 86 are packaged together as an optical coupler 87.

Light-emitting diode 86 is in a voltage sensing circuit connected between center tap terminal 40 and line 46. Since positive alligator connector 44 is connected to center tap terminal 40 and negative alligator connector 52 is connected to line 46, the circuit senses the voltage between connectors 44 and 52. The circuit includes resistors 88 and 90 and Zener diode 92. Resistor 88 has one terminal connected to center tap terminal and its opposite terminal to the cathode of Zener diode 92. The anode of Zener diode 92 is connected to line 46. Resistor 90 has one terminal connected to the cathode of Zener diode 92 and its other terminal connected to the anode of light-emitting diode 86. The cathode of light-emitting diode 86 is connected to line 46.

During normal operation, a voltage from the battery to which connectors 44 and 52 are attached will be sufficient to provide current through resistors 88 and 90 and light-emitting diode 86 to turn on light-emitting diode 86. The light from light-emitting diode 86 is received by triac 84, which switches to a conducting state. At that point the current path between line 46 and line 73 is complete, and triggering of SCR's 16 and 18 is possible.

If the polarity of the battery is reversed (i.e. connectors 44 and 52 are connected to the wrong battery terminals), the voltage between center tap terminal 40 and line 46 will be reversed, with center tap 40 being negative with respect to line 46. In this event, light-emitting diode 86 is reverse-biased and will not operate. Triac 84, therefore, cannot be triggered, and the circuit will not operate.

In the event of a short circuit between connectors 44 and 52, there will be no voltage or a very low voltage appearing between center tap terminal 40 and line 46. Once again, light-emitting diode 86 will not operate and triac 84 will remain in a nonconductive state. When a voltage of the proper polarity and having a magnitude of greater than a predetermined threshold voltage appears between connectors 44 and 52, the circuit will operate. This means, of course, that the circuit of FIG. 4 is only operable when connected in a system having a battery, so that the voltage appears between connectors 44 and 52.

The purpose of Zener diode 92 in the circuit of FIG. 4 is to provide a stable voltage across resistor 90 and light-emitting diode 86, despite variations in the voltage which may appear between connectors 44 and 52. This permits the circuit to be used with a wide range of possible voltages between connectors 44 and 52.

Figures 8, 9:
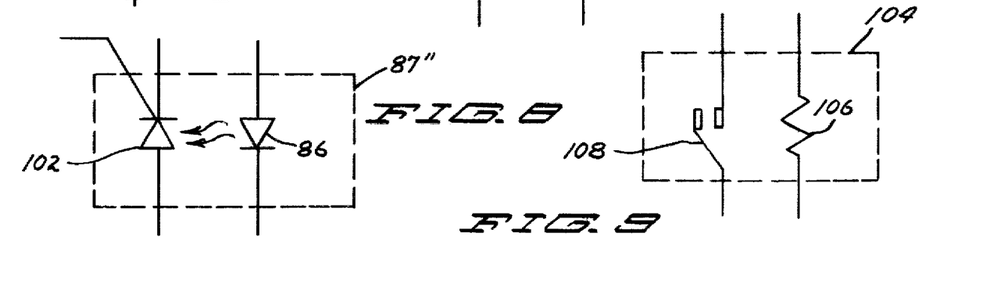

Although in the embodiment shown in FIG. 4 (and in the embodiments shown in FIGS. 5 and 6) the voltage sensing circuit includes light-emitting diode 86 which applies light to photosensitive triac 84, other well-known optical couplers like those shown in FIGS. 7 and 8 can be used. For example, an optical coupler 87' containing light-emitting diode 86 and phototransistor 100 (as illustrated in FIG. 7), or an optical coupler 87" containing light-emitting diode 86 and light-activated SCR 102 (as illustrated in FIG. 8) may be used in place of optical coupler 87. The operation of the circuit remains otherwise unchanged.

Optical coupler 87 may also be replaced by a reed relay 104 (as illustrated in FIG. 9). Coil 106 of reed relay 104 is connected in the voltage sensing circuit in place of diode 86, and contacts 108 of reed relay 104 are connected in the circuit path between line 46 and line 73 in place of triac 84. Reed relay 104 is polarity sensitive, since current in only one direction will cause the proper magnetic field from coil 106 to close contacts 108. If current passes in the opposite direction due to a reverse polarity connection of connectors 46 and 52, the magnetic field from coil 106 does not close contacts 108 and the current path through contacts 108 remains broken. Reed relay 104 also provides a short circuit protection, since it requires a certain threshhold voltage to be present in order to provide sufficient magnetic field from coil 106 to close contacts 108.

FIG. 5 shows another embodiment of the present invention which, like the embodiment shown in FIG. 4, provides short circuit protection, reverse polarity protection, and protection against overheating of the power pack. The embodiment of FIG. 5 utilizes two optical couplers 87a and 87b.

In the embodiment shown in FIG. 5, normally open switch 72 and normally closed thermal limit switch 82 are connected in series between line 46 and line 73. In addition, a voltage sensing circuit formed by resistors 88 and 90, Zener diode 92 and two light-emitting diodes 86a and 86b are connected between terminals 40 and line 46. Resistor 90 and light-emitting diodes 86a and 86b are connected in series with one another and in parallel with Zener diode 92.

The light from light-emitting diodes 86a and 86b controls photosensitive triacs 84a and 84b, respectively. As shown in FIG. 5, triacs 84a and 84b are connected between terminals 36 and resistors 64 in the charge control current path to the gates of SCRs 16 and 18. The power pack of FIG. 5 will only operate if voltage between connectors 44 and 52 is of the proper polarity and sufficient magnitude to forward-bias and turn on light-emitting diodes 86a and 86b. Photosensitive triacs 84a and 84b remain in a nonconductive state in the absence of light from light-emitting diodes 86a and 86b. As long as triacs 84a and 84b remain nonconductive, the gates of SCR's 16 and 18 cannot be triggered.

FIG. 6 shows another embodiment of the present invention which is generally similar to the embodiment shown in FIG. 5. The only difference is that light-emitting diodes 86a and 86b in FIG. 6 are connected in parallel with one another, rather than in series. The operation of the circuit of FIG. 6 is generally the same as the operation of the circuit of FIG. 5 except that a lower threshold voltage is required for turning on light-emitting diodes 86a and 86b, since they are in parallel rather than in series in FIG. 6. As discussed previously with respect to FIG. 4, optical couplers 87a and 87b in FIGS. 5 and 6 may be replaced by any of the devices illustrated in FIGS. 7-9.

Figure 10:
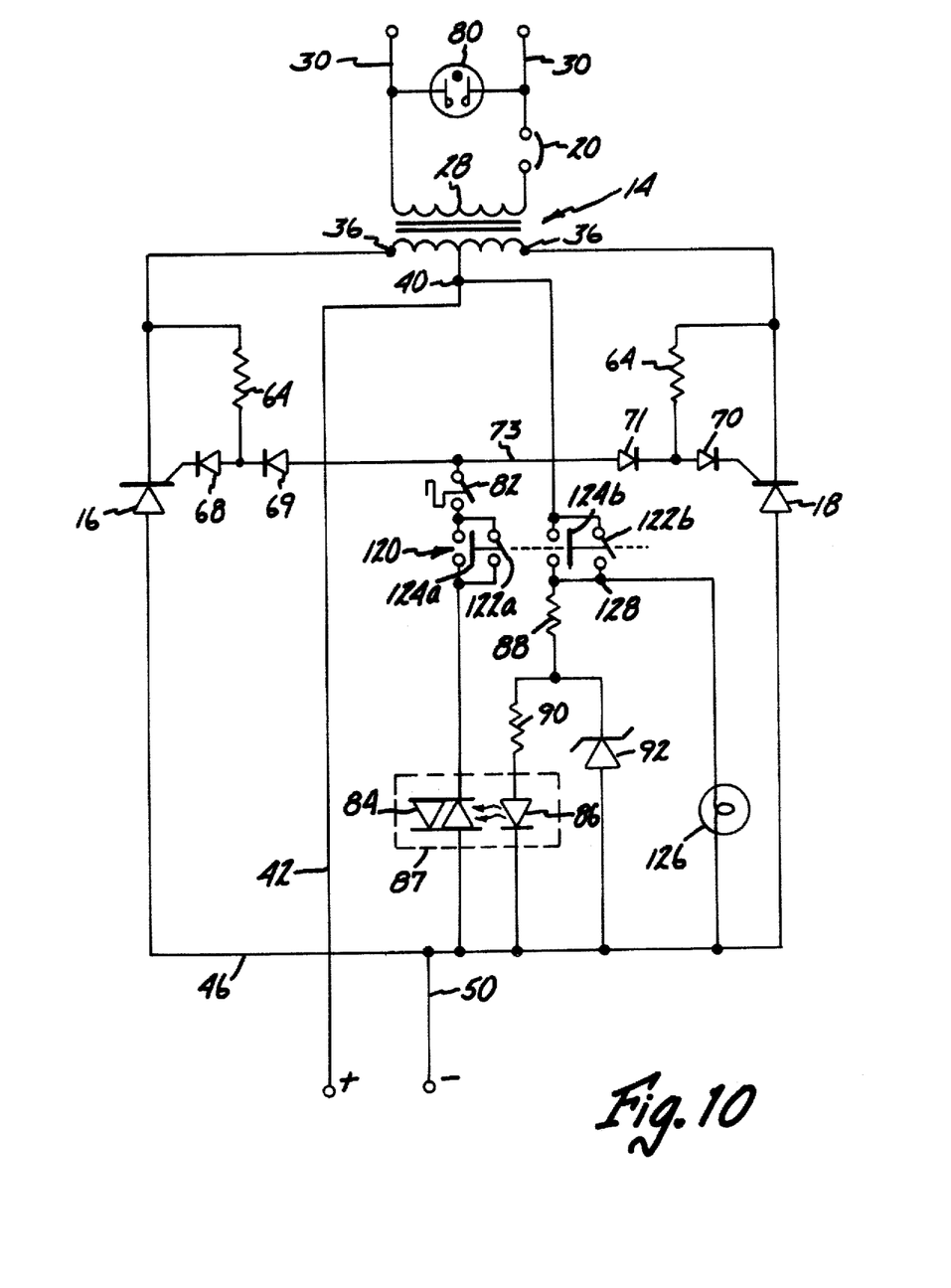
FIG. 10 shows a schematic representation of another preferred embodiment of the electrical circuitry of the present invention.

FIG. 10 shows another embodiment of the invention which may be used either as a portable unit, or may be permanently installed in a vehicle. The embodiment of FIG. 10 is generally similar to the embodiment shown in FIG. 4 except for the replacement of switch 72 with a multiple position multiple contact switch 120. As shown in FIG. 10, switch 120 has first ON/OFF contacts 122a, second ON/OFF contacts 122b, first momentary ON contacts 124a, and second momentary ON contacts 124b. All contacts 122a, 122b, 124a and 124b are mechanically linked together. First ON/OFF contacts 122a and first momentary ON contacts 124a are connected in parallel with one another and in series with thermal limit switch 82 and photosensitive triac 84. Second ON/OFF contacts 122b and second momentary ON contacts 124b are connected in parallel with one another and in series with resistor 88 in the voltage sensing circuit between terminal 40 and conductor 46.

The embodiment of FIG. 10 also includes an indicator lamp 126 which is connected between node 128 and conductor 46. When either contacts 122b or 124b are in an ON position, indicator lamp 126 is turned on. At all other times, indicator lamp 126 is off.

In the embodiment shown in FIG. 10, conductors 42 and 50 are either permanently connected to the positive and negative terminals of the vehicle battery by suitable connectors (not shown) or have alligator type clamp connectors 44 and 52 as shown in FIGS. 2-6. In either case, switch 120 must be actuated by the operator so that either momentary ON contacts 124a and 124b or ON/OFF contacts 122a and 122b are in an ON position in order for voltage to appear between conductors 42 and 50.

The embodiment shown in FIG. 10 is particularly advantageous when permanently installed in a vehicle with conductors 42 and 50 permanently connected to the positive and negative terminals of the vehicle's electrical system. In cold weather, when starting the vehicle may be difficult, the operator switches multiple contact switch 120, which is installed on or near the dashboard of the vehicle, to an ON position, so that contacts 122a and 122b are closed. This is done approximately five or ten minutes before an attempt is made to start the vehicle. In this time, the battery of the vehicle is charged and heated by the power supplied from conductors 42 and 50. When the vehicle is ready to be started, the operator leaves contacts 122a and 122b closed. As soon as the vehicle is started and running under its own power, the operator turns switch 120 off so that contacts 122a and 122b are open. The operator also must, of course, disconnect the lines 30,30 from the source of electrical AC power before driving the vehicle.

Indicator lamp 126 reminds the operator to turn switch 120 to an OFF position. In this way, the circuit is not operating and not drawing current from the battery during normal operation of the vehicle.

In addition to ON/OFF switch contacts 122a and 122b, momentary ON contacts 124a and 124b are also provided. This permits the operator to use the device with a momentary ON actuation, as is described further in the discussion of the previous embodiments.

During normal operation of the vehicle, switch 120 causes both the current path from terminal 40 to line 46, as well as the current path from line 73 to line 46, to be open. The circuit of the present invention, therefore, draws no electrical power from the battery during normal operation of the vehicle.

In another preferred embodiment of the present invention, ON/OFF contacts 122a and 122b are time controlled contacts which when actuated remain closed for a predetermined time and then are automatically opened by the timer. This embodiment prevents contacts 122a and 122b from being inadvertently left in an ON position for an indefinite time period. The predetermined time of closing of contacts 122a and 122b is selected to be sufficiently long to permit warming and charging of the battery, but not so long as to permit overcharging of the battery.

It is evident that a portable electrical power pack of the present invention can be utilized to supply power to DC electrical motors and other essential or auxiliary equipment utilizing direct current on diesel engines, wankel type engines, turbine engines, and any other engines that utilize fossil or synthetic fuels or electricity as their main power source.

Additionally, the rugged "solid state" construction of the electrical power pack of the invention makes it available for use in installations where "portability" can be considered in terms of actual installation of the power pack on a vehicle having an engine to be started and/or run utilizing the direct current from the power pack. For example, large trucks or even cars, campers and vans can carry power packs of the invention permanently mounted therein. In this situation, it will be necessary only to connect the input lead wires such as the wires 30,30 to a source of alternating current. This can be done by running an extension cord from any such source to the wires 30,30 of the vehicle or by extending the wires directly to a conventional alternating current outlet box such as shown at 32.

Similar installations can be carried on aircraft as well.

In connection with the maintaining of large truck, taxi or company car fleets, portable electrical power packs of the present invention will be mounted on simple two-wheel handcarts and will be wheeled to position adjacent the vehicle to be started somewhat as shown in FIG. 1 hereof. The vehicle engine will be started as explained above, and the power pack of the invention will be wheeled to position adjacent the next vehicle to be started or operated.

This specification is merely illustrative and other changes in structure and other uses of the invention will occur and will be covered within the spirit and scope of the claims which follow.

What is claimed is:

1. A power supply for providing direct electrical current to a pair of electrical input terminals from an alternating electrical current source, said power supply including:
   A. a transformer having a primary and a center-tapped, 3 terminal, second winding;
   B. means to connect the primary of the transformer to the alternating current source;
   C. a pair of semiconductor devices each having first and second main current carrying electrodes and a gate electrodes;
   D. a pair of output cables;
   E. means for connecting an interior end of each of said output cables to a separate one of the pair of engine electrical input terminals;
   F. an interior end of a first of said output cables being electrically connected to the center terminal of said transformer's secondary winding;
   G. the first main current carrying electrodes of each of said semiconductors being connected to a separate one of the outside terminals of the transformer's secondary winding;
   H. the second main current carrying electrodes of each of said semiconductors being connected together and to an interior end of a second of said output cables;
   I. a gate control circuit connected to the gate electrodes of said semiconductor devices;
   J. switch means connected into said gate control circuit to selectively cause said gate control circuit to switch said semiconductor devices into conduction;
   K. means for sensing the voltage between the first and second output cables and for enabling the gate control circuit only when the voltage between the first and second output cables has a predetermined polarity and a magnitude greater than a predetermined threshhold level;
   L. said means for sensing the voltage comprising:
      (1) a light-emitting voltage sensing control means connected between the first and second cables for providing a light emitted signal when the voltage between the first and second output cables has a predetermined polarity and a magnitude greater than the predetermined threshhold level,
      (2) switching means connected to the gate control circuit and having conductive and non-conductive states, the switching means switching from the non-conductive to the conductive state in response to the signal from the voltage sensing control.

2. The power supply of claim 1 wherein the voltage sensing control means further comprises reference voltage means for establishing a reference voltage across the light-emitting means when the voltage between the cables has the predetermined polarity and a magnitude greater than the predetermined threshhold level.

3. The power supply of claim 1 wherein a unidirectional current path is provided between the second and first main current carrying electrodes of each semiconductor device, and wherein the gate control circuit includes means for connecting the gate electrodes to the unidirectional current path.

4. The power supply of claim 3 wherein the switch means and the switching means are connected in the unidirectional current path.

5. The power supply of claim 4 wherein the unidirectional current path includes a pair of first diodes having their anodes connected together, a pair of resistors, each connected between a cathode of one of the first pair of diodes and the first main current carrying electrode of one of the semiconductor devices, and a portion of the unidirectional current carrying path between the anodes of the first pair of diodes and the second main current carrying electrodes to the semiconductor devices, the switch means being connected in said portion; and wherein means for connecting the unidirectional current path to the gate electrodes comprises a pair of second diodes, the cathode of each of the second diodes being connected to the gate of one of the semiconductor devices and the anode of each of the second diodes being connected to the cathode of one of the first pair of diodes.

6. The power supply of claim 5 wherein the switching means is connected in series with the switch means.

7. The power supply of claim 5 wherein the switching means comprise first and second switches connected in series with the pair of resistors.

8. The power supply of claim 5 and further comprising:
thermal limit switch means connected in series with the switch means, a thermal limit switch means being normally in a conductive state, and switching to a nonconductive state when a predetermined temperature level is exceeded.

9. A power supply for providing direct electrical current to a pair of electrical input terminals from an alternating electrical current source, said power supply including:
a transformer having a primary and a center-tapped three terminal, secondary winding;
means to connect the primary of the transformer to the alternating current source;
a pair of semiconductor devices each having first and second main current carrying electrodes and a gate electrode;
a pair of output cables;
means for connecting an exterior end of each of said output cables to a separate one of the pair of engine electrical input terminals;
an interior end of a first of said output cables being electrically connected to the center terminal of said transformer secondary winding;
the first main current carrying electrodes of each of said semiconductors being connected to a separate one of the outside terminals of the transformer secondary winding;
the second main current carrying electrodes of each of said semiconductors being connected together and to an interior end of a second of said output cables;
a gate control circuit connected to the gate electrodes of said semiconductor devices;
switch means connected into said gate control circuit to selectively cause said gate control circuit to switch said semiconductor devices into conduction;
an outer case encompassing said transformer, said semiconductor devices and said gate control circuit;
a block of solid, thermally stable, thermally conductive material intimately encompassing said transformer, semiconductor devices and gate control circuit elements inside said case, said thermally conductive material being in heat transfer relation with respect to said elements;
said case being made of thermally conductive material and being in intimate, heat transfer relationship with respect to said solid thermally conductive material;
a normally closed thermal limit switch embedded in said thermally conductive material, said limit switch being in series with the gate control circuit; p1 said means to connect the transformer primary to an alternating current source and said output cables each extending from position inside said case to the outside thereof for a sufficient distance to simultaneously connect to said alternating current source and to said engine input terminals, respectively; and
said switch means including a pair of electrical control lines extending from said gate control circuit inside of said case to the outside thereof, and including a normally open, manually closeable switching device outside of said case and connected between said control lines, said electrical control lines being of a length sufficient that the switching device can be positioned remote from the exterior ends of said input cables and adjacent the location of the operating controls of said engine when said transformer primary is connected to an alternating current source and said output cables are connected to said engine electrical input terminals.

10. The power supply of claim 9 wherein:
the semiconductor devices are silicon controlled rectifiers.

11. The power supply of claim 10 wherein:
said case is provided with a handle on an upper portion thereof.

12. The power supply of claim 9 wherein:
said gate control circuit includes: two pairs of first and second series connected diodes, the cathode of the second diode of each pair being connected to the gate of one of said semiconductor devices, and the anode of each of the first diodes of each pair being connected to each other;
a pair of resistors, each connected at a first end thereof to a first main current carrying electrode of one of the semiconductor devices and each connected to a second end thereof between one of the pairs of series connected diodes; and
a first of the electrical control lines of said switch means being connected to the mutually connected anodes of said first diodes of said pairs of series connected diodes, and a second of said control lines being connected to said second main current carrying electrodes.

13. The power supply of claim 12 wherein:
the semiconductor devices are silicon controlled rectifiers.

14. The power supply of claim 13 wherein:
said case is provided with a handle on an upper portion thereof.

15. A power supply for providing direct electrical current to a pair of electrical input terminals from an alternating electrical current source, said power supply including:
a transformer having a primary and a center-tapped, three terminal, secondary winding;
means to connect the primary of the transformer to the alternating current source; p1 a pair of semiconductor devices each having first and second main current carrying electrodes and a gate electrode;
a pair of output cables;
means for connecting an exterior end of each of said output cables to a separate one of the pair of engine electrical input terminals;
an interior end of a first of said output cables being electrically connected to the center terminal of said transformer secondary winding;
the first main current carrying electrodes of each of said semiconductors being connected to a separate one of the outside terminals of the transformer secondary winding;

the second main current carrying electrodes of each of said semiconductors being connected together and to an interior end of a second of said output cables;

a gate control circuit connected to the gate electrodes; and operator controlled multiple contact switch means having ON/OFF contacts and momentary ON contacts connected into said gate control circuit to cause the gate control circuit to switch said semiconductor devices into conduction when either the ON/OFF contacts or the momentary ON contacts are in an ON position.

16. The power supply of claim 15 and further comprising: indicator means for providing a human perceivable signal indicative of the ON/OFF contacts being in the ON position.

17. The power supply of claim 15 and further comprising: means for sensing the voltage between the first and second output cables and for enabling the gate control circuit only when the voltage between the first and second output cables has a predetermined polarity and a magnitude greater than a predetermined threshold level.

18. The power supply of claim 17 wherein the switch means further includes second ON/OFF contacts and secondary momentary ON contacts connected to the means for sensing voltage between the first and second output cables to prevent the flow of current to the means for sensing voltage unless either the second ON/OFF contacts or the second momentary ON contacts are in an ON position.

* * * * *